3,150,033
FILTER FABRIC AND METHOD OF MAKING IT
Pierre Gouzène, Noisy-le-Grand, Seine-et-Oise, France, assignor to Compagnie de Saint-Gobain, Neuilly-sur-Seine, France
No Drawing. Filed June 6, 1961, Ser. No. 125,313
Claims priority, application France June 13, 1960
3 Claims. (Cl. 162—145)

The filtration of industrial gas requires the use of filter fabrics, which have good strength, which are chemically inert, which are fireproof, and which provide an efficiency of filtration sufficient to eliminate solid particles which are suspended in gas, even though such particles are extremely fine. These problems become acute when the gases filtered are hot.

The materials now used often have one or another of these characteristics but all of the characteristics are never or are extremely rarely found in a single fabric. Some such fabrics are formed of cellulose and asbestos and these have good efficiency of filtration but they burn; those which are composed of asbestos and glass fibers are fireproof but have very low strength and do not possess a high efficiency of filtration, the more so when the fibers of glass used are extremely fine.

The present invention has as an object a process which produces fireproof material adapted for filtration of gases which has high strength, which can be used especially well as the filter in gas purification in which the gas contains extremely fine solid particles, and particularly at high temperature.

It is an object of the invention to prepare a new fireproof material, adapted to the filtration of gases, particularly hot gases, capable of removing from the gases particles of size even less than 1 mu without imposing a harmful obstruction to gas flow. It is another object to make such material by the usual techniques and machinery of the papermaking industry.

The objects are accomplished, generally speaking, by applying paper techniques to mixtures of glass fibers, asbestos fibers, and cellulose fibers, as essential constituents, and in an aqueous solution of alkali silicate, in adding calcium chloride for the precipitation of calcium silicate. The pulp is beaten in any of the usual beating engines, as the term is understood in the paper industry, and is felted by hand or mechanically on the usual papermaking machinery. The paper, or material may be made in various thicknesses.

The process according to the invention comprises preparing a dispersion of cellulose, glass fibers, and asbestos fibers in an aqueous solution of alkali silicate composed in such strength that the cellulose will be swollen by the alkali silicate. To this dispersion there is added calcium chloride in an amount sufficient to precipitate calcium silicate in situ, after which the suspension thus obtained is treated by the usual techniques of the papermaking industry. If need be, other useful but non-essential ingredients, such as are currently used in papermaking to improve the qualities of filter material can be added.

A preferred method of carrying out the process according to the invention consists in first dispersing the cellulose in a solution of alkali silicate, introducing this dispersion of cellulose into an aqueous dispersion of glass and asbestos fibers, mixing until homogeneous, and adding thereto the calcium chloride. The preliminary dispersion of the cellulose in the alkali silicate solution favors the swelling of the cellulose fibers which become impregnated with alkali silicate and this assures a better distribution of the calcium silicate when the precipitation takes place. Furthermore, the dispersion of cellulose in the solution of alkali silicate may itself be dispersed readily and uniformly in the suspension of mineral fibers by simple agitation. At the time of the precipitation by calcium chloride the calcium silicate which is produced is uniformly distributed not only in the mass of mineral fibers, glass and asbestos, assuring the creation of regular pores of very small dimensions in the filter fabric, but within the fibers of cellulose themselves which gives the filter material its fireproof character in spite of the combustible character of the cellulose.

The glass fibers which are to be chosen for the process of the invention may be of ordinary types which are currently available, for instance of a length between 2 and 6 mm. and a diameter between 1 to 6 mu. They may be all of the same diameter or a mixture of different diameters. The proportions of fibers of different qualities may be varied according to their diameters. For example, one may introduce up to 95% of the total weight of glass fibers as fibers of 1.5 mu in diameter, while if fibers of 3 mu diameter are used it is better not to exceed 90%, and for fibers of 6 mu not more than 50%. All these figures are indicative of good practice, not specific limitations. The asbestos to be used is preferably of the type used for filtration, an example of which is the type called "du Cap." The quantity of asbestos to use is on the order of about 5% to about 30% of the total weight of mineral fibers, that is, glass plus asbestos. Because of its texture the asbestos favors the good distribution and interweaving of glass fibers in the fabric.

The cellulose is preferably a good chemical pulp, particularly one having long fibers derived from resinous wood, but this does not exclude the use of other pulps. The quantity of cellulose in the pulp is preferably between .1 and about 10% with respect to the weight of the mineral fibers.

In manufacturing the new material one may operate successfully as follows: The asbestos fibers, in selected quantity are suspended in water so as to provide about a 2 to 3% suspension. This suspension is beaten in a standard beater for a length of time which varies from about 2 to about 6 hours depending on the quality of the asbestos. The glass fiber is not introduced into the suspension until after this beating has taken place, and the beating is continued in the presence of the glass fiber only for a very short time, for instance about 5 to 10 minutes in order to prevent the reduction of the length of the glass fibers below a length of about 1 mm. The suspension of cellulose in sodium silicate is prepared separately, the quantity of sodium silicate being calculated so that the precipitate of calcium silicate which will ultimately occur in the pulp will represent about 2 to 6% by weight of the mixture of the two mineral fibers. The suspension of cellulose is added to the suspension of mineral fibers after the beating and is readily homogenized by stirring.

After homogenization of the suspension of mineral fibers and cellulose containing alkali silicate, the calcium chloride is added in aqueous solution, precipitating calcium silicate in situ. The suspension thus obtained is then subjected to the usual steps of papermaking, eventually after addition of other adjuvants, particularly aluminum sulfate.

The material thus obtained has an organo-mineral structure which is practically fireproof, which resists chemical agents well, and has particularly high strength. It possesses an excellent filtering power for filtering gases especially hot gases and it permits the effectual capture of solid particles of the diameter of 1/10 mu without practically increasing the loss of head.

It may be advantageous to incorporate in the filtering material during fabrication, a flexible vinyl resin such as polyvinyl acetate, particularly in the form of an aqueous emulsion which can be added to the aqueous dispersion of mineral fibers before the addition of the suspension of cellulose in sodium silicate. One may incorporate, for example, up to 4% of polyvinyl acetate computed on the weight of the dry material with respect to the weight of the mineral fibers. The quantity of polyvinyl acetate retained on the finished fabric is usually a maximum of 2% by weight with respect to the mineral fibers. This flexible resin does not appear to affect the filtration of gas and is usually eliminated wholly or partially when the gas filtered is hot. The object of incorporating this resin is to greatly improve the pliability of the finished fabric and also to facilitate the manipulation and the holding of the material during the fabrication by usual papermaking methods. The following examples illustrate the process of manufacture according to the invention and give some figures on the quality of the filtering material produced.

EXAMPLE 1

To prepare a filter sheet capable of purifying gas at a temperature between 300 and 400° C. and capturing very fine particles having a diameter on the order of a tenth of a micron one disperses 4 kg. of asbestos in 200 liters of water and beats it in a standard beater for 4 hours. To the beater is added 16 kg. of glass fiber of a diameter of 3 mu with 800 liters of water. The beating is continued for 7 minutes more while slowly adding to the beater 1.6 kg. of an aqueous emulsion of polyvinyl acetate containing 50% of polyvinyl acetate.

Separately there has been prepared a mixture of 2 kg. of cellulose as a chemical pulp and 5 kg. of a solution of sodium silicate of 36° Bé. diluted to 50%. The chemical pulp is left in contact with the sodium silicate solution for 30 minutes in order to obtain a satisfactory swelling of the cellulose. The cellulose suspension is then mixed in the beater containing the suspension of mineral fibers and homogenized by agitation. After homogenization there is added 1 kilo of crystallized $CaCl_2.2H_2O$ in the form of a 25% aqueous solution and 2 kg. of aluminum sulfate. From that time, the vigor of the agitation is reduced and one proceeds to the usual processes of sheet finishing and drying of the fibrous material according to the usual papermaking techniques.

The filter material thus obtained presents the following characteristics:

| | |
|---|---|
| Thickness of the sheet | About 0.220 mm. |
| Rupture load | 1,000 grams in a width of 15 mm. (AFNOR Q 03004 test). |
| Bursting strength | 0.395 (AFNOR Q 03014 test). |
| Abrasion | 1.20% loss of weight in grams percent at the end of an abrasion test on an abrader measuring device of the type of Lhomme and Argy. |

The material is fireproof in spite of the high proportion of cellulose which it contains.

EXAMPLE 2

Operating as in Example 1 but using only 1 kg. of cellulose produced a material of the following qualities:

| | |
|---|---|
| Thickness of the sheet | About 0.220 mm. |
| Rupture load | 930. |
| Bursting strength | .385. |
| Abrasion loss | 2.07%. |

To facilitate the comparison of results these new fabrics have been listed in the following table, in which the percentages of each constituent are related to a total of 100 parts of the mixture of mineral fibers. The relative proportions of the two types of fibers is 20 parts of asbestos to 80 parts of glass.

*Qualitative and Quantitative Composition in Percent by Weight Related to the Weight of Asbestos Plus Glass Fibers*

| Examples | Cellulose | Asbestos | Glass fibers | Calcium silicate | Polyvinyl acetate | Aluminum sulfate |
|---|---|---|---|---|---|---|
| 1 | 10 | 20 | 80 | 4 | 4 | 10 |
| 2 | 5 | 20 | 80 | 4 | 4 | 10 |

*Characteristics*

| Examples | Rupture load | Bursting strength | Percent loss by abrasion |
|---|---|---|---|
| 1 | 1,000 | 0.395 | 2.20 |
| 2 | 930 | 0.385 | 2.07 |

An advantage of the invention is the preparation of a material which is capable of use as a gas filter to remove even particles of minute size and which is capable of use with gas at high temperature, being substantially fireproof. A particular advantage is the precipitation in situ within cellulose fibers of calcium silicate as a fireproofing agent. Other advantages will be apparent from the description and the claims.

As many apparently widely different embodiments of the present invention may be made without departing from the spirit and scope thereof, it is to be understood that the invention is not limited to the specific embodiments.

What is claimed is:

1. The method of making filter material, comprising suspending asbestos in water at a concentration of about 2–3%, beating the resulting suspension, adding glass fibers to the beaten suspension to make a pulp containing between about 30% and about 5% by weight asbestos based on the total weight of mineral fibers, beating to homogeneity and ending the beating before the glass fibers average much less than 1 mm., suspending sodium silicate and cellulose in water, and adding the suspension to the pulp in a proportion yielding between about 2 and about 6 parts by weight of silicate per 100 parts of mixed mineral fibers, after precipitation as calcium silicate, precipitating calcium silicate in situ, and forming a sheet from the pulp.

2. A filter comprising cellulose, glass fibers, asbestos, a flexible vinyl resin, calcium silicate, and aluminum sulfate, the glass fibers constituting about 80% of the combined weight of the mineral fibers, the asbestos constituting about 20%, the weight of the cellulose constituting about 5–10% of the combined weight of the mineral fibers, the calcium silicate constituting about 4% of the mineral fibers, the vinyl resin constituting about 4% of the mineral fibers, and the aluminum sulfate constituting about 10% of the weight of the mineral fibers.

3. The method of making filter material comprising suspending asbestos in water at a concentration of about 2–3%, beating the resulting suspension, adding glass fibers to the beaten suspension to make a pulp containing between about 30% and about 5% by weight asbestos based on the total weight of mineral fibers, adding up to about 4% of a flexible vinyl resin, beating to homogeneity and ending the beating before the glass fibers average much less than 1 mm., suspending sodium silicate and cellulose in water, and adding the suspension to the pulp in a proportion yielding between about 2 and about 6 parts by weight of silicate per 100 parts of mixed mineral fibers, after precipitation as calcium silicate, precipitating calcium silicate in situ, and forming a sheet from the pulp.

References Cited in the file of this patent

UNITED STATES PATENTS

| | | |
|---|---|---|
| 2,705,198 | Seybold | Mar. 29, 1955 |
| 2,797,163 | Smith | June 25, 1957 |
| 2,823,997 | Craig | Feb. 18, 1958 |
| 2,902,399 | Paquin | Sept. 1, 1959 |
| 2,932,601 | Hawley | Apr. 12, 1960 |
| 2,962,414 | Arledter | Nov. 29, 1960 |